May 21, 1929.   J. L. DRAKE   1,714,301
SHEET GLASS SURFACING APPARATUS
Filed May 10, 1926
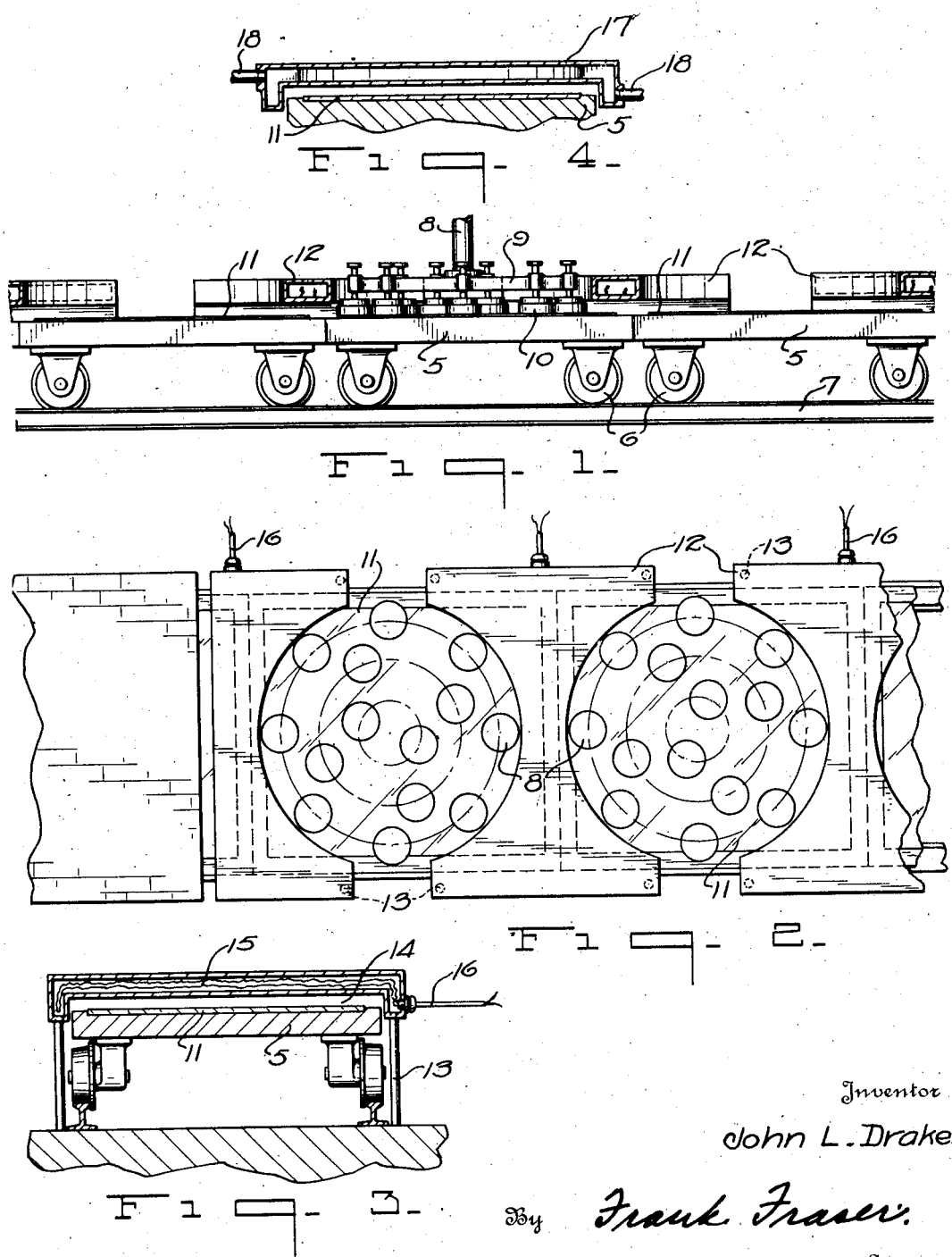
Inventor
John L. Drake.
By Frank Fraser.
Attorney Patented May 21, 1929.

1,714,301

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-SURFACING APPARATUS.

Application filed May 10, 1926. Serial No. 107,904.

The present invention relates to sheet glass surfacing apparatus.

An important object of the invention is to provide a sheet glass surfacing apparatus wherein a sheet of glass is subjected to the surfacing action of a plurality of surfacing units, and includes means for controlling the temperature of the glass between the said units.

Another important object of the invention is to provide an apparatus wherein a sheet of glass is moved progressively beneath a plurality of surfacing units, and includes means arranged between said units to maintain the temperature of the sheet between the units at substantially the same temperature as that of the glass under said units.

A still further object of the invention is to provide a sheet glass surfacing apparatus wherein a sheet of glass is continuously and progressively moved beneath a plurality of surfacing units, and includes hood means arranged between said surfacing units, and means for controlling the temperature within said hood means whereby the glass, in passing from one unit to another, will be protected from the surrounding atmosphere.

Still another object of the invention is to provide an apparatus for surfacing sheet glass wherein a sheet of glass is continuously and progressively moved beneath a plurality of surfacing units and in contact therewith, the apparatus including hood means arranged between adjacent units, and including means for heating the same so that the temperature of the glass, in passing from one unit to another, will be substantially the same as the temperature thereof under the surfacing units.

Other objects and advantages of the invention will become apparent during the course of the following description.

In the drawings wherein like numerals are employed to designate like parts throughout the same, Fig. 1 is a side elevation of the apparatus, partly in section for the purposes of illustration, Fig. 2 is a plan view thereof, Fig. 3 is a transverse section through one of the hood members, and Fig. 4 is a similar view of a slightly modified construction.

The present invention relates particularly to apparatus adapted for the surfacing of glass blanks to produce what is known in the art as plate glass. The plate glass blank is subjected to the action of a plurality of surfacing units, such as a grinding unit and a polishing unit.

The construction shown in the drawings is particularly adapted for use in the polishing operation of the glass blank, although it is not necessarily limited to such operation.

Ordinarily, after a plate glass blank has been ground, it is subjected to the polishing action of suitable polishing units or members. Polishing members ordinarily comprise a plurality of felt-covered blocks which are rubbed over the ground surface of the blank to produce a polished surface. During the polishing operation considerable heat is generated, so that the blank becomes relatively very warm.

In the so-called continuous process where a glass blank is continuously and progressively moved under a plurality of units, there is a space between adjacent units that the sheet must pass through in passing from under one unit to another. The units commonly used in the continuous process describe a circular path on the sheet so that there is considerable space between adjacent units, especially near the edges of the sheet. It has been found in actual practice that the polishing action and resultant heat generated must be so controlled that the sheet will not fracture when subjected to the action of the atmosphere in passing from under one unit to another. The margin of safety is such that the speed at which the sheet of glass can be polished is less than if the question of fracture of the sheet between adjacent units need not be considered. In other words, if no considerable heed is given to the question of breakage due to the relatively cool atmosphere contacting with the relatively warm sheet, the speed at which glass blanks could be polished is much greater than the speed at which the sheet is actually polished in the commercial production of polished plate glass.

The present invention, therefore, relates to means for permitting as much heat as desired and required to be generated, and includes means for protecting the sheet between adjacent surfacing units to prevent fracture of the sheet.

In Fig. 1, the numeral 5 designates a plurality of trucks or tables mounted on suitable wheels 6, adapted to run on track 7. The tables 5 are detachably associated, and when in use are coupled together to form a continuous table, upon which a plurality of glass blanks may be supported and moved progressively beneath a plurality of surfacing units 8. The particular units illustrated in the drawings are diagrammatic representations of polishing units, and may include a frame 9, carrying a plurality of felt-covered rotatable blocks 10, adapted to contact with the glass sheet 11, and to move relatively thereto to suitably surface the same.

As is clearly shown in Fig. 2, there is considerable distance between adjacent surfacing units 8. The blocks 10 are adapted to be moved upon the sheet, and together with the action of a suitable polishing compound, such as rouge suspended in water, the sheet is polished. During the surfacing action considerable heat is generated, so that the sheet of glass 11 becomes warm and subject to breakage if relatively cool atmosphere is permitted to act upon it.

The numeral 12 designates a hood adapted to be arranged between adjacent surfacing units 8. As is shown in Fig. 3, the hood 12 straddles the tables 5 and sheets 11 carried by said tables. Any suitable supporting members 13 may be provided to rigidly support the hoods 12. Means are provided to control the temperature of the space 14 between the hood and the sheet of glass 11. As shown in Fig. 3, suitable electrical resistance units 15, having connection with a suitable source of power 16, may be used to control the temperature, while in Fig. 4 the hood 17 has connections with conduits 18, by which means a fluid, such as air or water at the proper temperature, may be circulated therethrough. The temperature in and under the hoods is preferably maintained at substantially the same temperature as the temperature of the sheet under the surfacing units 8. By employing the hoods 12 between all of the surfacing units, the temperature of the sheet of glass will be substantially uniform from one end of the surfacing system to the other. To guard against breakage at the end of the unit from which the finished sheet is taken, the sheets of glass may be passed through a chamber whose temperature is gradually reduced. In other words, the sheet may be passed through, what is in effect, an annealing chamber to gradually reduce it to room temperature, thus guard against such fracture.

By obviating the danger of breakage between adjacent units, the speed at which a sheet of glass can be polished is increased. As the temperature conditions of the sheet are uniform, there is no rapidly heating of the sheet, subjecting it to relatively cool air, rapidly heating it again, etc., as has been common practice heretofore. Of course the type and shape of hood illustrated is only one of many forms which can be designed, while the two forms of temperature control mediums are only two of many forms.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass surfacing apparatus, a plurality of glass surfacing units, means for moving a sheet of glass progressively beneath said surfacing units, and means for preventing an appreciable change in the temperature of the glass sheet as it passes from one unit to another.

2. In sheet glass surfacing apparatus, a plurality of glass surfacing units, means for moving a sheet of glass progressively beneath said surfacing units, and means for preventing chilling of the glass sheet as it passes from one unit to another.

3. In sheet glass surfacing apparatus, a plurality of glass surfacing units, means for moving a sheet of glass progressively beneath said surfacing units, and means for controlling the temperature of the glass as it passes from one unit to another.

4. In sheet glass surfacing apparatus, a plurality of glass surfacing units, means for progressively moving a sheet of glass beneath said units, and temperature control means arranged between the units.

5. In sheet glass surfacing apparatus, a plurality of glass surfacing units, means for progressively moving a sheet of glass beneath said units, and means arranged between the units to prevent any great heat dissipation from the sheet of glass thereunder.

6. In sheet glass surfacing apparatus, a plurality of glass surfacing units, means for progressively moving a sheet of glass beneath said units, a hood arranged between said units and adapted to protect the glass sheet as it passes from one unit to another, and means for controlling the temperature in said hood.

7. In sheet glass surfacing apparatus, a plurality of glass surfacing units, means for moving a sheet of glass in contact with said surfacing units, and means for applying heat to the glass as it moves from one surfacing unit to another.

8. In sheet glass surfacing apparatus, a plurality of glass surfacing units, means for moving a sheet of glass in contact with said surfacing units, and means for protecting the glass sheet, as it passes from one unit to another, from the normal atmosphere.

9. In sheet glass surfacing apparatus, a plurality of glass surfacing units, means for moving a sheet of glass progressively from one unit to another, a hood arranged over the glass between the units, and means for maintaining the temperature in the hood substantially the same as the temperature of the glass when it is under said units.

10. The process of producing surfaced glass, consisting in subjecting a glass sheet to the successive action of a plurality of surfacing units, and controlling the temperature of the glass sheet between said units.

11. The process of producing surfaced glass, consisting in progressively moving a sheet of glass under a plurality of surfacing units, and controlling the temperature of the glass sheet between said units.

12. The process of producing surfaced glass, consisting in progressively moving a sheet of glass under a plurality of surfacing units, and maintaining the temperature of the glass between the units at substantially the same temperature as the temperature of the glass under the units.

13. The process of producing surfaced glass, consisting in progressively moving a sheet of glass under a plurality of surfacing units, and passing the sheet through a heated atmosphere between said units.

14. The process of producing surfaced glass, consisting in progressively moving a sheet of glass under a plurality of surfacing units, and passing the sheet through a heated atmosphere between said units, and maintaining the temperature of said atmosphere at substantially the same temperature as the temperature of the glass under said surfacing units.

15. In sheet glass surfacing apparatus, a plurality of glass surfacing units, means for subjecting the glass to the successive action of the surfacing units, and means for controlling the temperature of the glass between said units.

Signed at Toledo, in the county of Lucas, and State of Ohio, this 5th day of May, 1926.

JOHN L. DRAKE.